WILLIAM L. VENTURI
INVENTOR

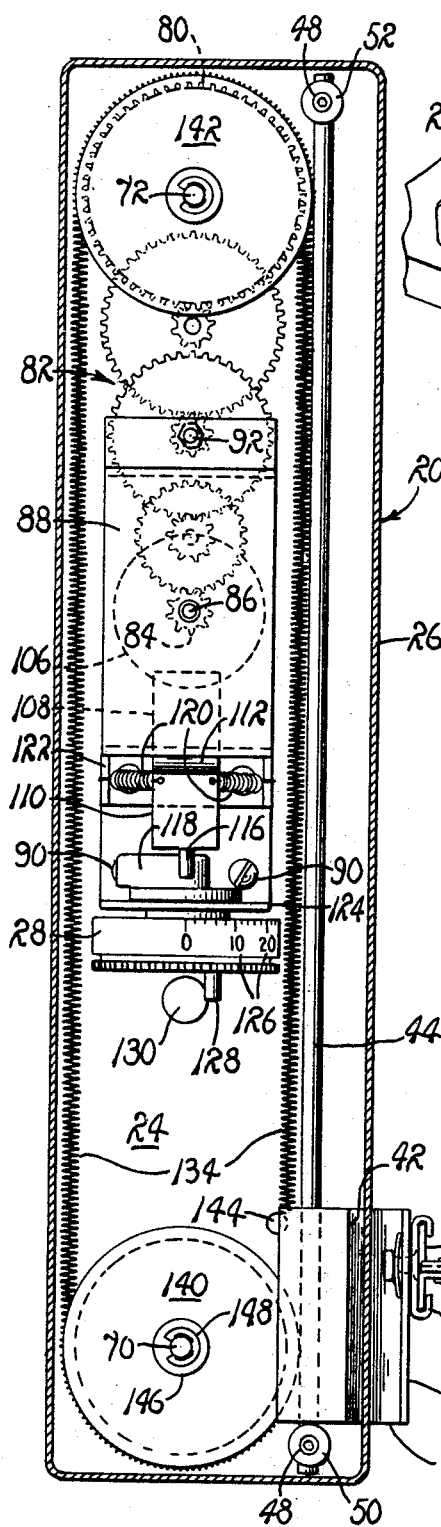

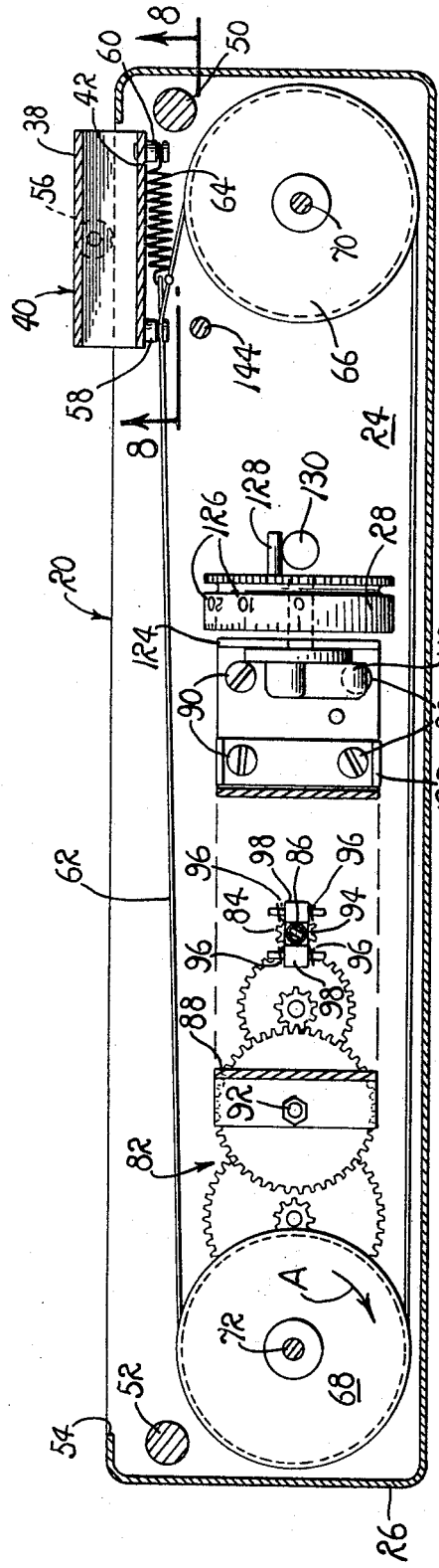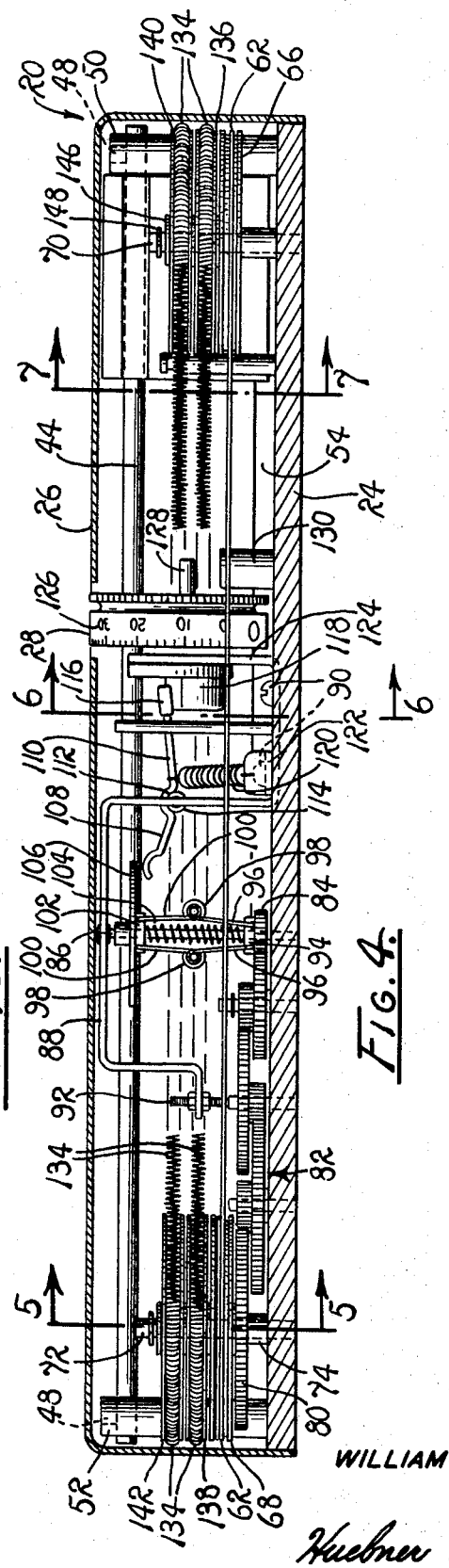

Huebner & Worrel
ATTORNEYS

United States Patent Office 3,524,268
Patented Aug. 18, 1970

1

3,524,268
READING PACER
William L. Venturi, Wishon, Calif., assignor to Teaching
Technology Corporation, a corporation of California
Filed July 22, 1968, Ser. No. 746,424
Int. Cl. G09b 17/04
U.S. Cl. 35—35                                    4 Claims

ABSTRACT OF THE DISCLOSURE

A simplified reading training device including a shutter supported on a carriage mounted for movement in response to the tensioning of an elongated low rate coil spring reeved about a plurality of idler pulleys to provide an extensive length of the spring in a limited space. The ends of a flexible line are connected to the carriage, the bight of the line engaging a pair of pulleys one of which is connected by a one-way clutch to a speed governing means for controlling the speed of movement of the carriage under the urging of the tension spring.

BACKGROUND OF INVENTION

The present invention relates to reading training devices of the type shown and described in U.S. Pat. Nos. 2,265,924, 2,568,577, 2,632,258, 2,662,307, 2,919,499, 2,919,500 and 3,255,538, and more partciularly to a device of such type which is of simpler and more economical construction.

The devices of the aforementioned patents variously rely for operation upon special types of springs, or employ magnetic brake speed governing mechanisms, or are of complicated construction. These and other items add to the cost and the complexity of the patented devices and contribute to possible breakdown thereof.

SUMMARY OF INVENTION

It is therefore an object of the present invention to provide a reading pacer which is of greater reliability.

Another object is to provide such a device which is simple in construction, and is economical to manufacture.

Another object is to utilize a conventional coil spring for powering the reading pacer and to provide means for accommodating an extensive length of such spring in a limited space.

Another object is to provide a substantially constant force spring drive system.

These and other objects and advantages are achieved by a reading pacer which consists essentially of a base or support plate and a carriage mounted thereon for linear movement under the urging of a coil spring which is tensioned by manual movement of the carriage to an energized position from a relatively de-energized position, the carriage having the ends of a flexible line connected thereto and engaging about a pair of sheaves, one of which is connected by a one-way clutch mechanism to a fly-ball speed governor controlling the movement of a movable plate, the extent of movement of the plate being controlled by a cam actuated brake for determining the speed of return movement of the carriage under the urging of the tensioned coil spring.

BRIEF DESCRIPTION OF DRAWINGS

FIG. 1 is a perspective view of a reading pacer embodying the principles of the invention illustrating its relation to a piece of reading material, such as a book.

FIG. 2 is a horizontal section through the cover of the device showing the internal mechanism in plan.

FIG. 3 is a horizontal section somewhat similar to FIG. 2 but taken at a lower level.

2

FIG. 4 is a longitudinal vertical section of the device.

Figure 5:
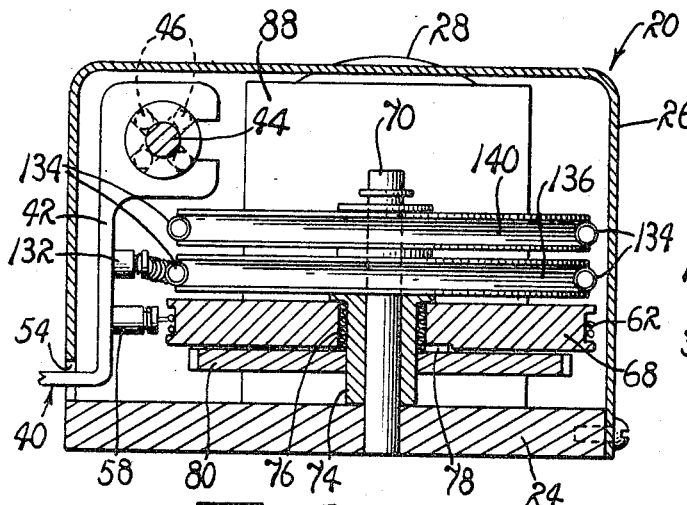

FIG. 5 is a larger scale vertical section of the device taken at a position represented by line 5—5 of FIG. 4.

Figure 6:
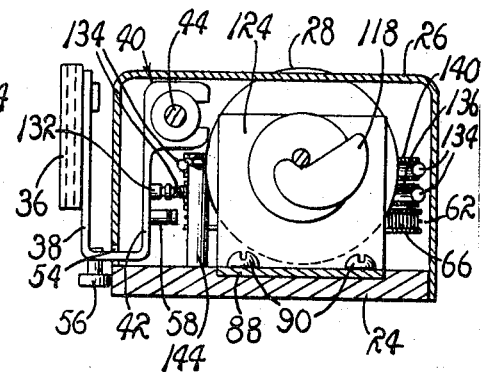
Figure 7:
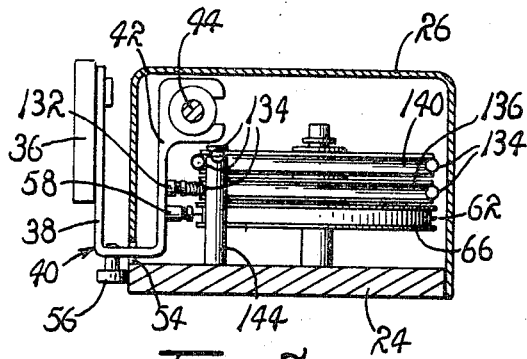

FIGS. 6 and 7 are vertical sections of the device taken at positions represented by lines 6—6 and 7—7, respectively, of FIG. 4.

Figure 8:
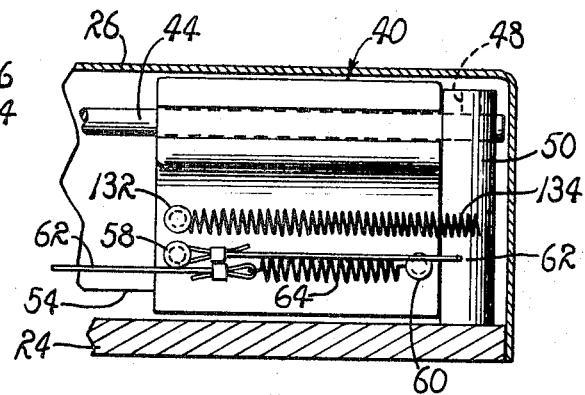

FIG. 8 is a framentary vertical section illustrating the manner of connecting a flexible line and the coil spring to the carriage.

Figure 9:
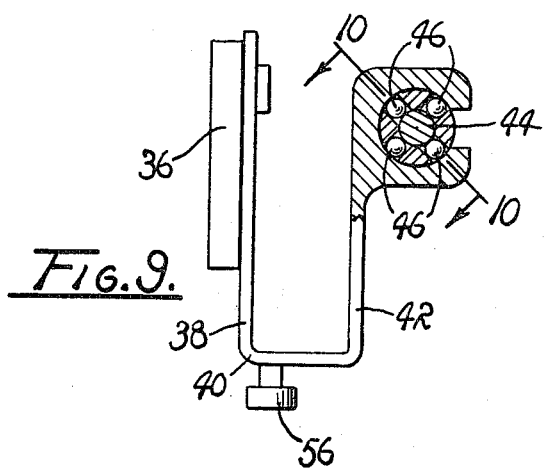

FIG. 9 is an end elevation, partly in section, of the carriage.

Figure 10:
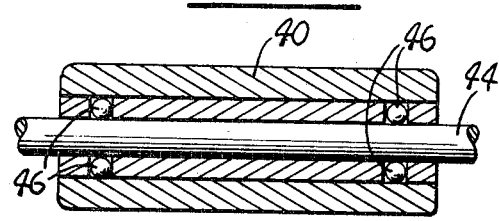

FIG. 10 is a longitudinal section taken generally on line 10—10 of FIG. 9.

FIG. 11 is an exploded view of a portion of the device illustrating the manner of connecting the ends of the coil spring and reeving the intermediate portion thereof about spaced idler pulleys.

FIG. 12 is a view somewhat similar to FIG. 11 but illustrating the manner of relating the flexible line to the carriage and a pair of sheaves.

DESCRIPTION OF EMBODIMENT

Referring to the drawings, there is shown in FIG. 1 a reading pacer 20 embodying the principles of the present invention which includes a shutter or masking arm 22 mounted for movement on a base plate 24 and powered by mechanisms concealed by a cover 26. The action of the mechanism is under the control of an adjustable wheel 28 for predetermining the speed at which the arm 22 moves down a page of reading material, such as a book 30 or the like. The pacer 20 and the reading material 30 may be supported on any suitable surface 32, such as the top of a table or desk or the like.

Inviting attention to FIG. 2, the arm 22 is provided with a T-shaped connector 34 detachably received in a bayonet type holder 36. The holder is secured to one leg 38 of a U-shaped carriage 40, the other leg 42 of which is journaled for sliding movement on a rod 44 by means of bearings 36, best seen in FIGS. 9 and 10.

Secured to the ends of the rod 44, by means of setscrews 48 or the like, is a pair of upstanding posts 50 and 52 fixed to the base plate 24, as shown in FIGS. 3 and 4. As will be appreciated from viewing FIGS. 5, 6 and 7, the rod 44 is disposed within the cover 26 which is provided with a slot 54 to accommodate the intermediate portion of the U-shaped carriage 40 in order that the leg 38 thereof be disposed exteriorly of the cover. For maintaining the legs of the carriage 40 generally vertical, the carriage is provided with a roller 56 which rides on one edge of the base plate 24.

Referring to FIGS. 3 and 8, the carriage 40 has fixed thereto a pair of connector posts 58 and 60. Attached to the post 58 is one end of a flexible line or cable 62, such as a cord or wire or the like, the other end of the line being connected to the post 60 by a short tension spring 64. The intermediate or bight portion of the line 62 is engaged about a pair of pulleys or sheaves 66 and 68 mounted for rotation on a pair of spaced bearing shafts 70 and 72 fixed to the base plate 24. The line 62 is merely reeved around the sheave 66 about one-half the circumference thereof but is wound around the sheave 68 one and one-half turns. This insures the transmission of force without slippage and the sheave 68 functions as a drum.

Inviting attention to FIG. 5, it will be noted that a bushing or sleeve 74 is journaled on the shaft 72 and wrapped around the bushing is a coil spring 76 having a tang 78 which engages in a notch in the drum 68 for rotation therewith. The bushing is fixed to a gear wheel 80 and the coil spring 76 is wrapped around the bushing in a manner such that rotation of the drum 68 in the direction of the arrow A, as shown in FIG. 3, causes the spring to wind in a decreasing radius to grip or lock on the bushing, thereby driving the gear wheel 80. Rotation of the drum 68 in the opposite direction causes the spring to unwind to an increasing radius and the grip on the bushing is loosened with the result that the sheave moves relative to the bushing without imparting rotation thereto. There is thus provided a one-way spring clutch for coupling and uncoupling the drum 68 and the gear wheel 80.

The gear wheel 80 is at one end of a reduction gear driving train designated generally by reference numeral 82 and having a pinion 84 at the outer end thereof as shown in FIGS. 3 and 4. The pinion is secured to a vertical shaft 86, the ends of which are suitably journaled in the base plate 24 and an inverted U-shaped frame 88 held in place on the base plate by screws 90 and an adjustable nut and bolt connection 92. Secured to the pinion 84 for rotation therewith is a cross arm 94 which has pivoted thereto the lower ends of pairs of links 96 disposed on opposite sides of the shaft 86, as shown in FIG. 3. The upper ends of the links are pivoted to a pair of fly-ball weights 98. As seen in FIG. 4, other pairs of links 100 have the lower ends thereof pivoted to the fly-ball weights 98 and their upper ends pivoted to a cross arm 102. The cross arm 102 is similar to the cross arm 94 and is vertically aligned therewith but is journaled on the shaft 86 for sliding movement relative thereto. The cross arms 94 and 102 are urged vertically apart, as shown in FIG. 4, by a coil spring 104 disposed about the shaft 86. Upon rotation of the pinion 84, the fly-ball weights 98 are impelled outwardly from the shaft 86 by centrifugal force which serves to pull the cross arm 102 downwardly against the bias of the spring 104. The links 96 and 100 constitute a toggle linkage in which the pivots of the links are substantially linearly aligned when the linkage is at rest.

For governing the speed of rotation of the pinion 84, and hence the speed of rotation of the gear wheel 80, the cross arm 102 has secured thereto a circular plate or brake disk 106 which is pulled into engagement with a brake arm 108. The toggle linkage is highly effective, even at relatively low speeds of about 100 r.p.m., in providing a sufficient amount of pull on the plate 106 to effect the desired braking action.

The arm 108 forms one end portion of a lever 110 extending through a suitable opening in the frame 88. The lever is formed with an intermediate arcuate portion or socket 112 supported on a transverse bearing 114 on the frame. The end of the lever 110 opposite the arm 108 is provided with a cam follower 116 which engages a cam 118. The lever is held in engagement with the bearing 114 and the cam 118 by means of a pair of springs 120 secured to the lever and to the ends of a bracket 122 held is place by a pair of the screws 90, as shown in FIG. 2. The cam 118 is disposed to one side of an upstanding plate 124 joined to one end of the frame 88. The cam is connected to the adjustable control wheel 28 by a shaft, not shown, which is journaled in the plate 124, the control wheel having indicia 126 thereon for indicating the setting of the cam. The position of the lever 110 can thus be controlled to obtain any desired speed of rotation of the fly-ball speed governing mechanism for determining the speed of the arm 22. The control wheel 28 is provided with a stud or pin 128 which engages with a limit post 130 for defining the limits of adjustment of the wheel.

As hereinbefore indicated, when the sheave or drum 68 is rotated in a direction opposite to that indicated by the arrow A in FIG. 3, the drum is uncoupled from the gear wheel 80 and the latter remains stationary. However, when the drum is rotated in the direction of the arrow A, it is coupled to the gear wheel 80 through the one-way spring clutch previously described, the speed of rotation being governed by the fly-ball speed governing mechanism in accordance with the disposition of the cam 118 as determined by the setting of the control wheel 28. The rotation of the drum in a direction opposite to that indicated by the arrow A is accomplished by manually moving the carriage 40 to the post 52 at the other end of the rod 34 from the inactive position shown in FIG. 2.

As shown in FIGS. 8 and 11, secured to the carriage 40 is a connector post 132 to which one end of an elongated tension coil spring 134 is attached, the spring being looped or reeved about a plurality of idler pulleys 136, 138, 140 and 142, the other end of the spring being attached to an upstanding connector post 144 affixed to the base plate 24. The pulleys 136 and 140 are journaled on the bearing shaft 70 in stacked relation to the sheave 66 and are separated therefrom and from each other by spacer washers 146 and are retained on the shaft by a split ring 148. The pulleys 138 and 142 are journaled for rotation on the bearing shaft 72 in stacked relation employing spacer washers 146 and a split ring 148. The spring 134 is a very low rate coil spring and the looping or reeving thereof about the plurality of idler pulleys provides an arrangement whereby an extensive length of the spring may be accommodated in a limited space, such length of spring assuring that the modulus of elasticity thereof is not exceeded by the aforementioned manual movement of the carriage and that the tension exerted thereby is substantially constant over the range of return movement of the carriage 40. Thus, when the carriage is manually moved from its inactive position to the post 52, the sheave or drum 68 is rotated oppositely to the direction of the arrow A and the spring 134 is stretched and tensioned so that upon release of the carriage the spring returns it to its inactive position. During such return, the drum is rotated in the direction of the arrow A but its speed of rotation is governed by the fly-ball speed governing mechanism which is coupled to the drum through the one-way spring clutch and the gear train 82.

In the interest of economy, the several parts of the device can be made from readily available materials such as plastics and metal and the like. For example, the sheaves, pulleys and gears may be made of plastic material which obviates the need for metal bearings for journaling the same. Also, the links 96 and 100 may be fashioned from U-shaped pieces of wire to provide bail members the intermediate portions of which can be journaled in slots cut in the cross arms 94 and 102 and the ends of which can be fashioned into rings for pivotal connection to the fly-ball weights 98. Other economies will readily occur to those skilled in the art.

If desired, the arm 22 can be made of clear or opaque material or a pair of interchangeable arms of different materials can be provided.

OPERATION

The operation of the device of the present invention is believed to be clearly apparent and is briefly summarized at this point. With the pacer 20 disposed adjacent to the page of reading material 30 and the speed control wheel 28 set for desired speed of movement of the masking arm 22, the arm is manually moved to the top of the page and released, causing the reader to pace his reading of the material in accordance with a speed of the arm as it moves down the page. Manual movement of the arm 22 up the page causes the sheave 68 to be rotated in a direction opposite to that indicated by the arrow A, such movement of the sheave uncoupling the one-way clutch so that the sheave moves relative to the gear wheel 80 which remains stationary. This also stretches the spring 134 and tensions the same. Upon release of the carriage 40, the tension in the spring urges it toward its inactive position, thereby inducing rotation of the sheave 68 in the direction of the arrow A, which serves to couple the sheave to the gear wheel 80 through the spring clutch, the speed of rotation of the sheave then being governed by the fly-ball speed governing mechanism in accordance with the setting of the limit arm 108 by the control wheel 28.

The reading pacer of the present invention is reliable in its timing, readily adjusted to selected speeds, constant in its conformance to the speed of adjustment, simple in construction, economical and durable. It provides an improved constant force spring drive system which is uniquely suited to the regulated spacing of reading rate by the masking arm 22.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A reading device comprising a base, a carriage mounted for reciprocal movement on the base, a pair of spaced sets of idler pulleys freely rotatably mounted on the base adjacent to said carriage, an elongated tension spring disposed about one set of said idler pulleys and having an end anchored to said base and an opposite end connected to said carriage for longitudinally tensioning the spring during movement of the carriage in one direction and providing a force returnably to propel the carriage in the opposite direction, a flexible tension member disposed about the other set of said idler pulleys and providing opposite ends connected to said carriage for movement with the carriage in each direction, and governor means operatively associated with said tension member to regulate the speed of said return movement of the carriage.

2. In a reading pacer having a base, a carriage mounted on the base for reciprocal movement through a rectilinear path, a masking arm extended from the carriage, and energy storing means connected to the carriage adapted to store energy when the carriage is moved in one direction and to drive the carriage in the opposite direction when the carriage is released; a governing system comprising a pair of pulleys mounted for free rotation on the base in spaced relation longitudinally of said path, a flexible tension member having an end connected to the carriage, extended about the pulleys and providing an opposite end connected to the carriage whereby movement of the carriage rotates the pulleys, and a governor having driven and controlling connection to one of the pulleys whereby the speed of the carriage is sensed and regulated through the flexible tension member.

3. A reading device comprising an elongated support having opposite ends; a carriage mounted for movement of the support; a pair of sheaves mounted for rotation on the support in spaced relation; a flexible line having opposite ends connected to the carriage and a bight in engagement with the sheaves; resilient means having ends connected to the carriage and to the support with the carriage being manually movable toward one of said sheaves from an inactive position adjacent to the other sheave for tensioning the resilient means and rotating the sheaves in one direction; a speed control mechanism; one-way clutch means interconnecting the speed control mechanism and said one sheave to effect a disconnection therebetween during rotation of the second sheave in said one direction and effecting a connection therebetween in response to rotation of the second sheave in the reverse direction upon return of the carriage to said inactive position under the urging of the tensioned resilient means; and at least one idler pulley at each of the ends of the support, said resilient means being an elongated low rate coil spring looped about the idler pulleys.

4. A substantially constant force spring drive system comprising a base; a carriage mounted on the base for reciprocal rectilinear movement thereon in a predetermined path; a pair of spaced posts mounted on the base in substantially equally spaced relation to the path; a plurality of idler pulleys mounted on the posts for free rotation thereon; an elongated tension spring having one end anchored to the base, tensioned about the idler pulleys and having an opposite end connected to the carriage; a further idler pulley mounted on each post for free rotation thereon; a flexible tension member having opposite ends connected to the carriage and therebetween being tensioned about the further pulleys whereby they are rotated in response to carriage movement; a gear train having driven connection to one of the further pulleys; and an adjustable fly-ball governor connected to the gear train regulating the speed of travel of the carriage through said gear train, the pulley to which the train is connected and the tension member in accordance with such adjustment.

References Cited
UNITED STATES PATENTS

| 979,670 | 12/1910 | Hopkins | 40—356 |
|---|---|---|---|
| 3,255,538 | 6/1966 | Gooch. | |
| 3,311,998 | 4/1967 | Macomber. | |

WILLIAM H. GRIEB, Primary Examiner